Figure 1:
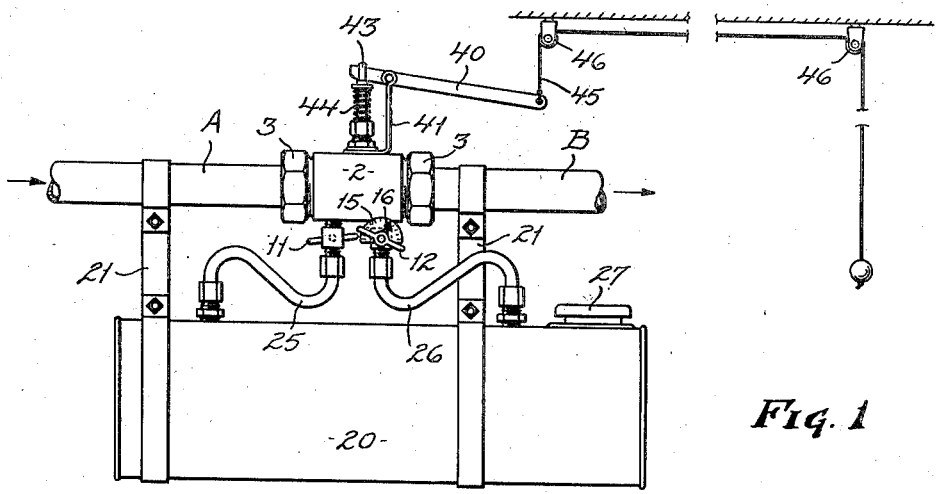

Nov. 22, 1938.　　　　G. C. GLYNN　　　　2,137,755

WATER SOFTENING DEVICE

Filed Sept. 8, 1936

INVENTOR.
BY　CLIFFORD C. GLYNN
Bates, Goldrick & Teare
ATTORNEYS

Patented Nov. 22, 1938

2,137,755

UNITED STATES PATENT OFFICE 2,137,755

WATER SOFTENING DEVICE

Guilford C. Glynn, Cleveland, Ohio

Application September 8, 1936, Serial No. 99,732

9 Claims. (Cl. 210—31)

This invention relates to an apparatus and device for use particularly in connection with a water supply system for admixing chemicals such as water softeners, with the water.

It is common knowledge that in most localities very considerable economy can be effected in the use of soap if the hardness of water, as supplied to the plumbing system, can be modified by the correction or elimination of the mineral content, which is responsible for the condition known as "hardness", usually combinations of lime and magnesium, as bicarbonates, sulphates, etc. Heating the water in the usual hot-water range partially overcomes so-called temporary hardness of the water as by decomposing soluble bicarbonates, etc., of calcium and magnesium, but this has little or no effect upon the sulphates, which are largely responsible for permanent hardness. The successful correction in a given water supply is dependent upon the application of well-known chemical principles as by supplying water softeners to the water in the plumbing system, in predetermined proportions relative to the volume of water flowing past a given point in the system. Examples of such water softeners are lime, soda ash and trisodium phosphate, but the particular chemical used should be determined by testing the water in the given locality. The proportion of softener to be supplied should be determined both by reference to the hardness of the water and the use to be made of it; viz: whether for laundry or for lavatory use. In the former a high pH hydroxyl concentration is desirable for counteracting acidities and increasing the detergent effects of soap. One authority states that one pound of cheap lime softens as much water as twenty pounds of soap. Thus a great saving can be effected if proper control can be had in administering such softening agent to water in a domestic supply system.

A further consideration illustrating the present need for a practical, delicately controllable and partially automatic device or apparatus for softening water for home use is seen in the growing dislike on part of women of using soap to cleanse the skin; soap for this purpose being believed to be harmful. Thus for household use the softening treatment should be of such a nature as to be completely controllable without danger of producing excess alkalinity accidentally, but with the possibility of increasing alkalinity when such condition is desirable.

The principal object of the present invention, is to provide a practical solution to the problems above outlined or suggested.

A specific object is to provide a simple and effective device for administering controlled quantities of chemicals, such as a water-softener into a supply line for fluid, such as water.

Other objects and features of the invention will become apparent from the following description relating to the accompanying drawing, which shows the preferred apparatus.

The illustrated embodiment of the invention, in brief, is a device adapted to be positioned anywhere in the piping of a water system, without presenting complicated plumbing problems, and may comprise a tubular unit which replaces a severed section of water pipe, the tube having a transverse partition with an orifice in it for the passage of water and having lateral inlet and outlet passages on opposite sides of the partition leading to a supply tank for the softening compound or solution. The partition is so related to the lateral passages that only the outlet passage is in a region of reduced pressure occasioned by the combined action of the partition and its orifice. A further important feature is the provision of a valve for controlling the orifice in a manner to increase the dosage of chemical to the water as when temporarily increased softening is desired.

Figure 2:
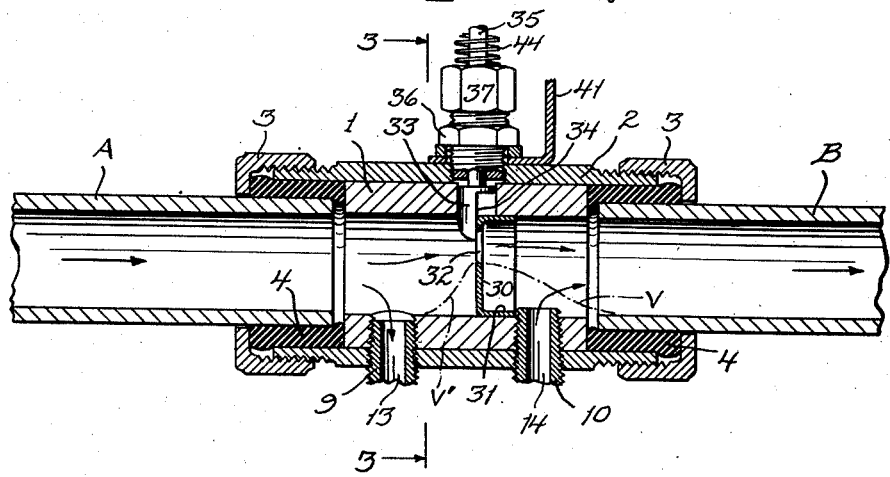
Figure 3:
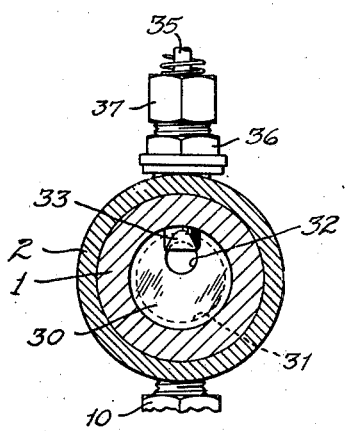

Referring briefly to the drawing; Fig. 1 is a side elevation showing a suitable arrangement of apparatus for controlling the dosage of chemicals to a water supply system; Fig. 2 is a longitudinal central sectional view of the main operating unit, and Fig. 3 is a transverse sectional view of the unit as indicated by the line 3—3 on Fig. 2.

Referring in detail to the drawing, characters A and B represent sections of a water-supply pipe leading, for example, to the ordinary heating range and storage tank of a domestic water heating system; B being the section leading directly to the range. The sections are separated, as shown in Fig. 2, as by cutting out a short length of the pipe, as originally installed.

Referring particularly to Fig. 2, I indicates an inner metal tube disposed between the sections A and B, and having a central bore of substantially the same inside diameter as the pipe. The tube I is contained in a somewhat longer outer tube or sleeve, both ends of which extend beyond the tube I in loosely surrounding relationship to the end portions of respective pipe sections A and B.

Both ends of the sleeve 2 are externally threaded to receive nuts 3, for compressing suitable packing 4 against the pipe sections, the adjacent ends of the tube 1 and the inside of the sleeve 2; thereby tightly sealing the unit against water leakage.

In order to assemble the above described unit onto the pipe it is usually necessary to remove at least one of the pipe sections from its position in the plumbing system, so that the adjacent ends of the sections A and B may be inserted into the sleeve 2, whereupon the piping is again reestablished, using a union-nut and sleeve assembly of the usual type when necessary.

Threaded discharge and inlet fittings 9 and 10 respectively extend into appropriately threaded openings in both the sleeve 2 and tube 1, preferably from below. Both these fittings may include valves of any suitable design, having operating handles 11 and 12, respectively, as shown on Fig. 1, for controlling the effective passages 13 and 14 of the fittings 9 and 10. One or both valves may have indicating means, shown for example by the dial 15 and pointer 16. The chemical to be supplied to fluid in the pipes, is preferably carried in a tank 20, suspended below the pipes as on straps 21. The tank has suitable pipes and connections 25 and 26 for communicating the interior of the tank with the respective fittings 9 and 10.

For re-charging the tank, it may have at one end a relatively enlarged filler opening adapted to be closed by a suitable quickly detachable cap 21. Both passages 13 and 14 are normally in communication with the interior of the tank and the tube 1.

Intermediately of the ends of the tube 1 is a partition member 30 which, as shown, in the form of a cap-like disc having a flange 31 tightly fitting the interior of the tube 1. The partition has an orifice at 32 which is eccentric with respect to the axis of the sleeve 1 and disposed diametrally opposite the outlet and inlet passages 13 and 14. The disc is prevented from slipping out of place "down stream" by reason of its flange 31 abutting one side of the threaded fitting 10. It is prevented from movement out of place in the opposite direction by a valve head 33 having a planar face 34 in sliding contact with the adjacent face of the partition and arranged to be moved at least partially across the orifice 32 thereof to restrict or close it. The adjustment of operation of the device by control of the valve 33 will be referred to later in connection with the operation of the apparatus.

The adjusting valve 33 is slidable vertically in a lateral bore in the tube 1 and has a stem 35 slidably mounted in a screwed-in fitting 36 carried on the sleeve 2. Sealing packing around the stem may be retained by a nut 37 on the top of the fitting. For controlling the position of the valve 33, I have shown a lever 40 pivoted intermediately of its ends on a bracket 41, the lower bent end of which underlies a wrench-engaging enlargement on the fitting 36. The lever has a suitable connection 43 with the stem 35, and a compression spring 44 by pressing upwardly on the connection 43 and downwardly against the nut 37 normally holds the valve in open position with respect to the orifice 32 in the partition 30. The valve may be operated at will to restrict or close the orifice 32 by means of a pull cord 45, suitably arranged as on pulleys 46 suspended on the ceiling e. g. of the basement. The operation of the device is as follows:

When fluid flows in the conduit, A—1—B pressure differential occurs adjacent the orifice 32, in proportion to the velocity of flow therethrough. As water is fed from the pipe section A toward the section B part of it flows into the fitting 9 and thence into the tank 20. Concurrently liquid flows from the tank into the water supply, namely through the fitting 10 into the tube 1 as indicated by the arrows on Fig. 2. The principal active force is the region of reduced pressure which is normally coextensive with the broken line V at the "down-stream" side of the partition 30. This region of low pressure always covers the outlet orifice of the passage 14. A similar low pressure region is created on the opposite side of the partition, namely, as shown at V' but this never extends over the passage of the fitting 9 so as to counteract the suction effect of the low-pressure region V over the passage 14. The result of turning on of a water tap, connected with the pipe section B, is a gradual feeding of the water-softener solution contained in the tank 20 into the line A—1—B which feeding is directly proportional to the velocity of flow through the line. As the rate of flow of water through the line A—1—B is increased, a larger supply of softener is injected into the supply of water conveyed by the section B. The orifice 32 is controlled as previously stated by the valve member 33, so that when the occasion arises, that a greater increase in the proportion of softening chemical relative to the water is desirable, for example for laundry purposes to counteract acidity and increase the detergent effect of soap, then the operator pulls the cord 45, restricting or closing the orifice 32 and causing greater suction effect at V and increase in positive pressure at the entrance to the fitting 9, thereby administering a larger dose of softener to the fresh water.

When the user has determined, as by experimentation, about how much softening treatment is suitable for a particular purpose, say lavatory uses, she can adjust the valve 12 with the aid of the pointer 16 and/or the valve 11 with its pointer when present, very accurately to control the amount of softener admitted to the fresh water for an average rate of flow to and from the hot water storage tank. Thereafter the dosage to the water system operates, for all practical purpose, automatically to secure the desired softening.

The arrangement of the restricting device in the tube in the form of a flanged disc not only provides a cheap construction, but it enables the ready change of the size of the orifice to provide for installations where the pressure may differ materially from the usual standard. The plug valve 33 sliding across the orifice furnishes ready means for cleaning the orifice should it become obstructed by foreign matter. Moreover, by holding the valve across the orifice, thereby diverting the course of water through the passages 13 and 14, any foreign matter which might have accumulated over the mouths of the passages will be immediately removed.

My device is easy to assemble and install; when in use is leak proof; and recharging of the tank with the proper chemicals is made an easy matter by reason of a filler opening and cap of sufficient size to avoid spilling the chemical or having to use a funnel.

I claim:

1. An apparatus for modifying fluid passing through a conduit, comprising a by-passage leading from and to the conduit and incorporating a storage space for chemical, a cup shaped disc, the flange of which fits the conduit and the web of which forms a relatively thin partition in the conduit between the inlet and outlet of the by-passage, said partition having an orifice which, in effect, restricts the conduit and creates a region of relatively low pressure over the return inlet of the by-passage for drawing a portion of the chemical content of the storage space into the aforesaid fluid.

2. A device for modifying fluid passing through a conduit, comprising a partition in the conduit having an eccentric orifice within its periphery, a lateral passage in the conduit wall on the downstream side of the partition, means constantly connecting said passage with a storage space for chemical, and means on the upstream side of the partition connecting the conduit with said space, said passage opening into the conduit at a region sufficiently close to the partition and on the opposite side of the pipe axis from the orifice so that a constant directional flow through said storage space will maintain a predetermined admixture of the chemical content of the storage space with fluid normally conveyed by the conduit.

3. In apparatus of the class described, a tube adapted to be positioned between spaced sections of water piping and to continue the bores thereof in a straight path, means sealingly to connect the opposite ends of the tube with the piping, a partition slidably inserted into the tube and having a frictional engagement with the internal surface thereof, disposed across the bore of the tube and having a relatively restricted orifice, a tank for chemical, conduit means including an outlet passage leading from the tube into the tank, and conduit means including an inlet passage leading from the tank to the tube and discharging thereinto in a position sufficiently close to the partition so that suction induced by water flowing through the orifice and beyond the partition will maintain injection of fluid from the tank into the tube, and means projecting laterally into the tube on the downstream side of the partition and in contact therewith to hold the partition in place.

4. In apparatus of the class described, a tube adapted to be positioned between spaced aligned water pipe sections, a transverse partition adapted to be slid into the tube and having an orifice for conveying water from one pipe section to another in the tube, a by-passage including inlet and outlet fittings secured in operative relation to the tube, a storage tank for chemicals, said passages communicating with the tube and adapted for conveying fluid from the tube to the storage tank, and fluid from the storage tank back into the tube, one of said fittings being extended into the interior of the tube in a manner to hold the partition member against movement in a down-stream direction.

5. In an apparatus of the class described, the combination of a tubular coupling for spaced pipe sections, lateral by-passage means associated with the coupling for injecting modifying fluid into the fluid normally conveyed by the piping and coupling, the interior of the coupling being cylindrical, and a partition comprising a disc having a through opening and a marginal flange, the flange snugly engaging the cylindrical wall of the coupling, the by-passage communicating with the coupling on opposite sides of the flanged disc.

6. In apparatus of the class described, the combination of a tubular coupling for spaced pipe sections, lateral by-passage means associated with the coupling for injecting modifying fluid into the fluid normally conveyed by the piping and coupling, a partition in the coupling between the outlet and inlet of the by-passage, said partition having an orifice leading therethrough, and a valve member movable with relation to the orifice of the partition for restricting or closing the orifice.

7. In an apparatus of the class described, the combination of a tubular coupling for spaced pipe sections, a lateral by-passage associated with the coupling for injecting modifying fluid into the fluid normally conveyed by the piping and coupling, an orificed partition extending across the interior of the coupling between the inlet and outlet of the by-passage and a movable plug guided in a lateral bore in the wall of the coupling and having a flat face engaging the partition and adapted to be moved across the orifice to restrict the same.

8. In combination, a tube adapted to be interposed between spaced pipe sections, means having a restricted orifice disposed across the tube, a conduit for conveying fluid from the tube at one side of said means and back into the tube on the other side, a storage reservoir for chemical operatively disposed between the effective ends of the conduit, a valve arranged to close the orifice, yielding means normally holding the valve in non-restricting position, and manually controlled means for operating the valve to restrict or close the orifice.

9. In apparatus of the class described, a coupling for aligned pipe sections comprising a relatively short tube adapted to be positioned between such pipe sections, a sleeve surrounding the tube and threaded at both ends, said threaded ends lying beyond opposite ends of the tube and surrounding end portions of respective pipe sections, packing interposed between the projecting ends of the sleeve and the pipe sections, means threaded on the ends of the sleeve to compress the packing, lateral passages in the tube and sleeve connectible to a storage space for chemical and means restricting the tube between the passages to cause withdrawal of fluid from said space into the tube at one of said passages.

GUILFORD C. GLYNN.